(12) United States Patent
Wilhelmsson et al.

(10) Patent No.: US 9,094,154 B2
(45) Date of Patent: Jul. 28, 2015

(54) ADAPTATION OF TRANSMISSION FORMAT

(71) Applicant: Telefonaktiebolaget L M Ericsson (publ), Stockholm (SE)

(72) Inventors: Leif Wilhelmsson, Dalby (SE); Joakim Persson, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/009,135

(22) PCT Filed: Sep. 6, 2013

(86) PCT No.: PCT/EP2013/068495
§ 371 (c)(1),
(2) Date: Nov. 6, 2013

(87) PCT Pub. No.: WO2015/032440
PCT Pub. Date: Mar. 12, 2015

(65) Prior Publication Data
US 2015/0071370 A1    Mar. 12, 2015

(51) Int. Cl.
| | | |
|---|---|---|
| H04B 15/00 | (2006.01) |
| H04L 1/00 | (2006.01) |
| H04L 1/08 | (2006.01) |
| H04L 5/00 | (2006.01) |
| H04L 1/16 | (2006.01) |
| H04L 1/20 | (2006.01) |
| H04B 1/403 | (2015.01) |
| H04L 1/18 | (2006.01) |
| H04W 16/14 | (2009.01) |
| H04B 17/309 | (2015.01) |

(52) U.S. Cl.
CPC ............ *H04L 1/0006* (2013.01); *H04L 1/0001* (2013.01); *H04L 1/08* (2013.01); *H04L 1/1671* (2013.01); *H04L 1/20* (2013.01); *H04L 5/0055* (2013.01); *H04B 1/406* (2013.01); *H04B 17/309* (2015.01); *H04L 1/0026* (2013.01); *H04L 1/1854* (2013.01); *H04L 1/1887* (2013.01); *H04L 5/0062* (2013.01); *H04W 16/14* (2013.01)

(58) Field of Classification Search
CPC ......... H04L 1/0026; H04L 1/20; H04L 47/14; H04L 1/0033; H04W 72/0406; H04W 72/04; H04B 7/2606; H04B 7/0673
See application file for complete search history.

(56) References Cited

U.S. PATENT DOCUMENTS

| | | |
|---|---|---|
| 7,369,484 B1 | 5/2008 | Prismantas et al. |
| 7,822,124 B1 | 10/2010 | Rezvani |
| 2003/0126492 A1 | 7/2003 | Cavin |
| 2006/0256747 A1 | 11/2006 | Jaakkola |
| 2007/0217550 A1 | 9/2007 | Wu et al. |

(Continued)

FOREIGN PATENT DOCUMENTS

EP     2485522 A1    8/2012

*Primary Examiner* — Kenneth Lam
(74) *Attorney, Agent, or Firm* — Murphy, Bilak & Homiller, PLLC

(57) ABSTRACT

A radio frequency communication device (100A) comprising a radio frequency communication interface (130) and a controller (110), wherein said controller (110) is configured to: transmit a message through said radio frequency communication interface (130) to a receiving radio frequency communication device (100B) using a transmission format; receive an indication on whether the reception of the message is primarily limited by noise (N) or interference (I); adapt said transmission format; and retransmit said message using said adapted transmission format.

25 Claims, 4 Drawing Sheets

(56) References Cited

U.S. PATENT DOCUMENTS

| | | |
|---|---|---|
| 2008/0117888 A1 | 5/2008 | Popescu et al. |
| 2008/0238629 A1 | 10/2008 | Gonikberg |
| 2010/0208712 A1 | 8/2010 | Wax et al. |
| 2011/0154145 A1* | 6/2011 | Lomnitz ................. 714/749 |
| 2012/0099450 A1* | 4/2012 | Madan et al. ........... 370/252 |
| 2012/0155403 A1* | 6/2012 | Lee ......................... 370/329 |
| 2013/0237231 A1* | 9/2013 | Nagaraja et al. ....... 455/438 |
| 2014/0226552 A1* | 8/2014 | Niu et al. ................ 370/312 |

\* cited by examiner

ADAPTATION OF TRANSMISSION FORMAT

TECHNICAL FIELD

This application relates to a method, a radio frequency communication device and a communication system for improved determination of an appropriate transmission format, such as a coding scheme, for radio frequency communication.

BACKGROUND

For radio frequency communication systems, especially those operating in unlicensed bands, there are two major reasons for errors, namely noise and interference. To counteract noise and interference, there are two main approaches which are principally different. The first one is to use forward error correcting coding FEC, which essentially means that redundancy is added to the information at the transmitter side. The added redundancy can be used by the receiving device to correctly decode the information. The second approach is to use automatic retransmission request (ARQ), which means that in case the receiver is not able to decode the information, it requests a retransmission.

These two main alternatives, FEC and ARQ, can also be combined which is referred to as hybrid ARQ. In addition, in case of retransmission, it is also possible to retransmit other information which can aid in the decoding.

Whether FEC or ARQ is the most suitable approach depends on the channel conditions. If the link is limited by noise, i.e. the received signal strength is too weak, then FEC is typically preferable. On the other hand, if the major problem is burst-like interference, then retransmission using ARQ is typically more effective. In particular, when operating in the Industrial, Scientific and Medical band (ISM-band), where the likelihood for burst-like interference is high, applying FEC may actually worsen the problem. The reason for this is that applying FEC means that the data packet increases in length and the probability that some part of the packet is interfered is therefore increased. Because the interference is often very strong, the FEC will not be powerful enough to help.

Since FEC is efficient in case of noise, but might degrade the performance in case of interference, it is essential to know whether the link is noise limited or interference limited in order to decide whether to increase or decrease the amount of coding.

The existing solutions operate so that the device which determines which modulation and coding scheme to apply does this by estimating whether noise or interference is the main cause for the errors. As this is based on an estimation, finding a suitable coding and modulation scheme may therefore take some time, making it less useful for short messages and also making it less effective when the channel conditions are rapidly varying The approach taken today is that the transmitting devices selects a coding and modulation scheme and sometimes alters the scheme to see if another set of parameters might actually give better performance, possibly based on an estimation.

In addition to changing the modulation and coding scheme, it is also possible to adjust the length of the packet. This is also done by the transmitter side based on estimation rather than on explicit information from the receiver side.

Therefore, there is a need for a radio frequency communication device being able to adapt, quickly and without additional cost, to both interference and noise.

Furthermore, the contemporary technology relies heavily on resending message packages. With the exception for broadcast standards, virtually all standards for wireless communications support some kind of retransmission scheme. When a data packet is not correctly received, the receiving device requests the transmitting device to retransmit information related to the erroneous packet. The idea is that the channel conditions hopefully would be better for the retransmitted packet. In some systems a packet is resent and is to be combined with the previously sent packet to increase the chances of a correct decoding. In other systems, the resent packet is encoded differently to increase its chances of being decoded correctly.

Irrespectively which of the above approaches that is taken, the packet used for retransmission is at least of the same length and transmitted at the same power. This means that in case of retransmission, twice the amount of channel resources are needed. The retransmission is thus somewhat wasteful in terms of power, channel allocation, etc., which in case of an interference limited system means that more interference than necessary is created towards the other users.

The waste of resources is further increased if also the reception of the retransmitted packet is unsuccessful, as then yet another retransmission might be performed.

This leads to that many times an unnecessary amount of resources is used for the retransmission. Specifically, often the original packet is very close to being correctly decoded and just a slight additional amount of information is needed, not a retransmission of a packet of the same length as the original one. This means that the transmission is wasteful in terms of used resources.

When the systems is interference limited, if several of the users are using the transmission medium more than necessary this can lead to significant performance degradation.

There is thus a need for a manner of resending data packets that does not cause wasteful use of resources.

SUMMARY

It is an object of the teachings of this application to overcome at least some of the problems listed above by providing a transmitting radio frequency communication device comprising a radio frequency communication interface and a controller, wherein said controller is configured to transmit a message through said radio frequency communication interface to a receiving radio frequency communication device using a transmission format, receive an indication on whether the reception of the message is primarily limited by noise or interference, adapt said transmission format, and retransmit said message using said adapted transmission format.

This enables a transmitting radio frequency communication device to be informed of current channel conditions and adapt a transmission format accordingly without having to make estimations and run trial-and-error schemes.

It is further an object of the teachings of this application to overcome the problems listed above by providing a receiving radio frequency communication device comprising a radio frequency communication interface and a controller, wherein said controller is configured to receive a message through said radio frequency communication interface from a transmitting radio frequency communication device, determine a primary cause of limitation to reception is noise or interference, transmit an indication on whether the reception of the message is primarily limited by noise or interference to said transmitting radio frequency communication device, and receive a retransmitted message having been transmitted using an adapted transmission format.

In one embodiment the determination a primary cause of limitation is done by analyzing said received message.

Here the retransmitted message may be exactly the same information transmitted once again but using the same or another transmission format, or the retransmitted message may contain different information which either on its own or combined with the previously transmitted message can be used to correctly receive the original message. The used transmission format, i.e., the used modulation, coding, and packet length, may or may not be the same as for the originally sent packet.

The transmission format may be adapted by adapting the coding scheme, the packet length or the modulation.

This enables the receiving radio frequency communication device to provide information to the transmitting radio frequency communication device concerning the current channel conditions, thereby enabling the transmitting radio frequency communication device to adapt a transmission format accordingly without having to make estimations and run trial-and-error schemes.

In one embodiment the indication on whether the reception of the message is primarily limited by noise or interference is part of an acknowledgment message being sent by the receiving radio frequency communication device in response to receiving the corresponding message to the transmitting radio frequency communication device. In one embodiment the indication on whether the reception of the message is primarily limited by noise or interference is part of a message comprising ACK/NACK bits.

This enables a simple implementation that is easy to include in existing systems and also saves on bandwidth as no further messaging is required.

It is a further object of the teachings of this application to overcome the problems listed above by providing a method for use in a radio frequency communication device comprising a radio frequency communication interface, wherein said method comprises transmitting a message through said radio frequency communication interface to a receiving radio frequency communication device using a transmission format, receiving an indication on whether the reception of the message is primarily limited by noise or interference, adapting said transmission format, and retransmitting said message using said adapted transmission format.

It is a further object of the teachings of this application to overcome the problems listed above by providing a method for use in a radio frequency communication device comprising a radio frequency communication interface, wherein said method comprises receiving a message through said radio frequency communication interface from a transmitting radio frequency communication device, to determine a primary cause of limitation to reception is noise or interference, transmitting an indication on whether the reception of the message is primarily limited by noise or interference to said transmitting radio frequency communication device, and receiving a retransmitted message having been transmitted using an adapted transmission format.

In one embodiment the determination a primary cause of limitation is done by analyzing said received message.

In one embodiment the radio frequency communication device is configured to adapt a time for transmission based on the interference type. This has several advantages as will be discussed in the below.

The inventors of the present application have realized, after inventive and insightful reasoning, that it is important to understand that in bidirectional communication the two links (one in each direction) may face radically different signaling conditions. In case the signaling is noise limited and the transmission power and the receiver sensitivity are sufficiently similar, the links can be considered to be symmetrical. Communication links might also be symmetrical in case the two devices are close enough so that it can be assumed that the interference conditions at both ends are equal. However, with the support for longer transmission ranges, which for instance is the case in Bluetooth and also in IEEE 802.11ah, the interference for the two devices might differ significantly.

Another situation where the interference might differ significantly is for dense deployment of WiFi. In this case the access points (AP) may typically be allocated frequencies such that they should not interfere too much with one another, and also that a station (STA) connected to one AP should not interfere too much to any other AP. For the STAs, on the other hand, these might interfere with one another to a much larger extent making the two directions of the link very non-symmetric when it comes to interference. In addition, for the case of an AP and a STA, the link may also be non-symmetrical when it comes to noise as the output power of the AP may be significantly higher than the output power of the STA.

These circumstances makes it very difficult to make a correct estimation and the trial-and-error prior art technologies will most likely have to make several adjustment before making a correct estimation of the channel conditions.

Adaptive coding and modulation is commonly used in various wireless systems to enhance user experience as well as to optimize spectrum efficiency of the system. In cellular systems like WCDMA and LTE, both the modulation and the coding can be changed depending on channel conditions. However, in both these systems the interference has a very similar effect on the performance as noise has in the sense that it is noise-like. In fact, one often talks about signal-to-interference-plus-noise-ratio (SINR), and for the algorithms used to determine suitable coding and modulation formats, it therefore does not make a difference.

The approach not to explicitly determine whether noise or interference is the major cause of degradation is also used in some algorithms for selecting modulation and coding scheme (MSC) in WiFi. Rather, the idea is to use as high data rate as possible as long as the packet error rate is not too high.

However, by realizing that noise and interference may impact the link very differently in unlicensed bands, and also realizing that the receiving device has full opportunity to analyze the received signal and will thus be able to determine the channel conditions more precisely, and by enabling the receiving device to transmit information on the channel conditions to the transmitting device it is possible to adapt the coding scheme much quicker and without using a trial-and-error approach.

The teachings herein are thus much faster and more precise in providing an appropriate coding scheme adapted for specific channel conditions.

Should the channel conditions differ for two devices communicating with one another, each device may analyze the channel conditions for the other device and inform them of their channel conditions so that each device may select an appropriate coding scheme.

It is an object of the teachings of this application to overcome at least some of the problems listed above by providing a transmitting radio frequency communication device comprising a radio frequency communication interface and a controller, wherein said controller is configured to transmit a first message through said radio frequency communication interface to a receiving radio frequency communication device using a transmission format, receive an indication of a type of interference limiting the reception of the message, adapt a transmission parameter for transmission based on said type of interference (I); and transmit a second message according to said adapted transmission parameter. In one embodiment the transmission parameter is transmission time. In one embodiment the transmission parameter is message length. In one embodiment the transmission parameter is transmission power.

It is a further object of the teachings of this application to overcome at least some of the problems listed above by providing a transmitting radio frequency communication device comprising a radio frequency communication interface and a controller, wherein said controller is configured to receive a message through said radio frequency communication interface from a transmitting radio frequency communication device, determine a type of interference, transmit an indication of said type of interference to said transmitting radio frequency communication device. This has the benefit of avoiding interference by transmitting at a time when the interference is low or inactive or at a message length that is optimized for not being interfered with. Alternatively or additionally, the transmission power may be adapted based on the interference type so that the message may be received clearly and uncorrupted even when interfered with.

It is a further object of the teachings of this application to overcome at least some of the problems listed above by providing a method for use in a transmitting radio frequency communication device comprising a radio frequency communication interface and a controller, wherein said method comprises transmitting a first message through said radio frequency communication interface to a receiving radio frequency communication device using a transmission format, receiving an indication of a type of interference limiting the reception of the message, adapt a transmission parameter for transmission based on said type of interference (I); and transmit a second message according to said adapted transmission parameter. In one embodiment the transmission parameter is transmission time. In one embodiment the transmission parameter is message length. In one embodiment the transmission parameter is transmission power.

It is a further object of the teachings of this application to overcome at least some of the problems listed above by providing a method for use in a receiving radio frequency communication device comprising a radio frequency communication interface and a controller, wherein said method comprises receiving a message through said radio frequency communication interface from a transmitting radio frequency communication device, determining a type of interference, transmitting an indication of said type of interference to said transmitting radio frequency communication device.

These methods have the same advantages as the radio frequency communication devices disclosed herein.

The inventors of the teachings of this application has realized, after insightful and inventive reasoning, that by determining a time for transmission based on a determined interference, the transmitter will be able to transmit any messages (solely) at times when an interferer is silent and thereby increase the chances of a message being successfully received as well as decreasing the bandwidth and communication systems resources needed to successfully transmit a message. Also, the interference caused to other communication systems is also decreased.

Other features and advantages of the disclosed embodiments will appear from the attached detailed disclosure.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
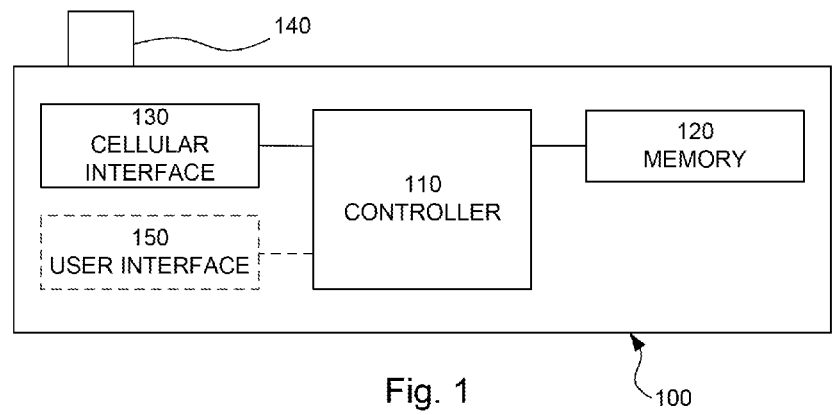
FIG. 1 shows a schematic view of the general structure of a radio frequency communication device according to one embodiment of the teachings of this application.

FIG. 1 shows a schematic overview of a general radio frequency communication device adapted according to the teachings herein. Examples of such radio frequency communication devices are a base station also referred to as eNode, a User Equipment also referred to as UE (for example a mobile communications terminal or cellular telephone), an access point also referred to as AP, a Bluetooth-enabled device or other device adapted for radio frequency (RF) communication. In the embodiment shown the RF communication device 100 is a device having at least one radio frequency communications interface 130. The radio frequency communications interface 130 may be adapted to operate according to one or a combination of at least one of the standards IEEE 802.11 (WiFi), IEEE 802.15.4 (ZigBee for example), Bluetooth®, NFC (Near Field Communication) or other short range (radio frequency) communication interface, RFID (Radio Frequency Identification), Sigfox, Universal Mobile Telecommunications System (UMTS), 3GPP Long Term Evolution (LTE), High Speed Packet Access, HSPA, or Global System for Mobile communication, GSM. It should be noted that the teachings herein may also be implemented using other cellular communications standards.

However, the teachings herein may also beneficially be used in unlicensed RF bands in which interference and noise have different influence on the received signals. One example of such an RF band is the industrial, scientific and medical (ISM) band at 2.45 GHz or other ISM bands. In such an embodiment the radio frequency communications interface 130 is arranged to operate in the unlicensed band, solely or in addition to one of the standards above.

The general sensor 100 also comprises at least one antenna 140 which may be external or internal.

The memory 120 may be implemented using any commonly known technology for computer-readable memories such as ROM, RAM, SRAM, DRAM, FLASH, DDR, EEPROM memory, flash memory, hard drive, optical storage or any combination thereof. The memory 120 is used for various purposes by the controller 110, one of them being for storing sensor data and operating instructions for the RF communication device 100.

The RF communication device 100 may optionally comprise a user interface 150 which may comprise a display (possibly a touch display), a number of light indicators, possibly implemented as LEDs (Light Emitting Diodes), and at least one key.

Figure 2:
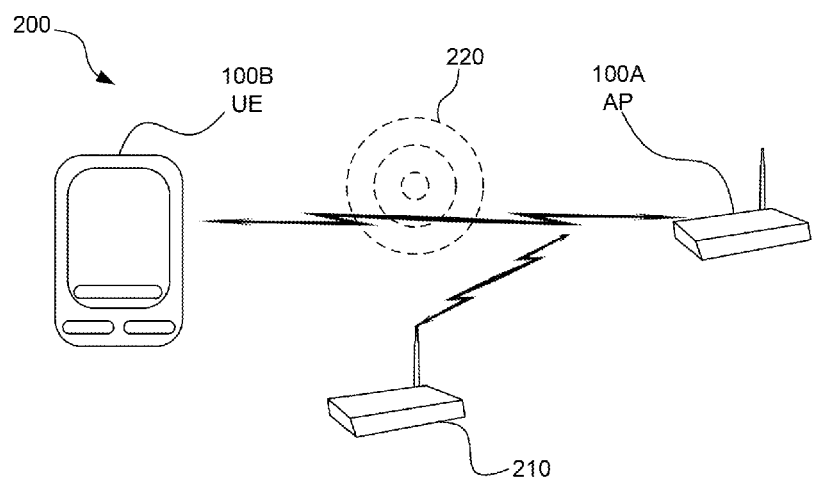
FIG. 2 shows a schematic view of a communication system comprising a radio frequency communication device according to one embodiment of the teachings of this application.

FIG. 2 shows a schematic view of a communication system 200 in which the RF communication device 100 is arranged to be used. The communication system may be a communication system arranged to operate according to one (or a combination of) the standards mentioned above in relation to the radio frequency communication interface 130.

The communication system 200 comprises at least two RF communication devices 100A and 100B that are arranged to communicate with one another, and possibly also other RF communication devices 100. In the example of FIG. 2 only two RF communication devices are shown, one being an access point (AP) 100A, the other being a user equipment (UE) such as a mobile or cellular phone 100B.

In one example of such a communication system 200 the RF communication devices 100 may be a Bluetooth®-enabled UE, or a sensor or an accessory. Alternatively an access point, acting as a gate way to the internet.

Other examples include, but are not limited to: one RF communication device 100B being a user's mobile phone and the other RF communication device 100A being a tag and as such, being placed on an object or a pet for enabling tracking of the pet or object; or one RF communication device 100B being a user's mobile phone and the other RF communication device 100A being a sensor in the user's house so that the user may control the sensors from his phone or, at least, receive readings from the sensors. Such RF communication devices 100 may suffer from interference from example from a neighbour's WiFi-router.

It should be noted that even though the examples given herein only includes two RF communication devices 100 in the communication system 200, it should be noted that the communication system 200 could comprise further RF communication devices 100.

Either of the RF communication devices 100 may communicate with the other by transmitting a radio frequency signal, indicated by the zig-zag arrow in FIG. 2. How such signals are transmitted and received are well-known in the art and will not be discussed in greater detail herein.

In any communication system environment in a modern day society there will be some background (or other) noise that reduces the quality of the signal being transmitted between two RF communication devices 100. In FIG. 2, this noise is indicated as a symbolic noise source 220.

The transmission of the signal may also be influenced by interference from other radio frequency communication sources 210. Such interference may significantly interfere with the transmission causing a receiving RF communication device to be unable to decode the signal correctly. In FIG. 2, the interference is represented by an interfering device (such as another access point AP or other UE) 210 and the interference itself is represented by the zig-zag arrow emanating from the AP 210.

Figure 3:
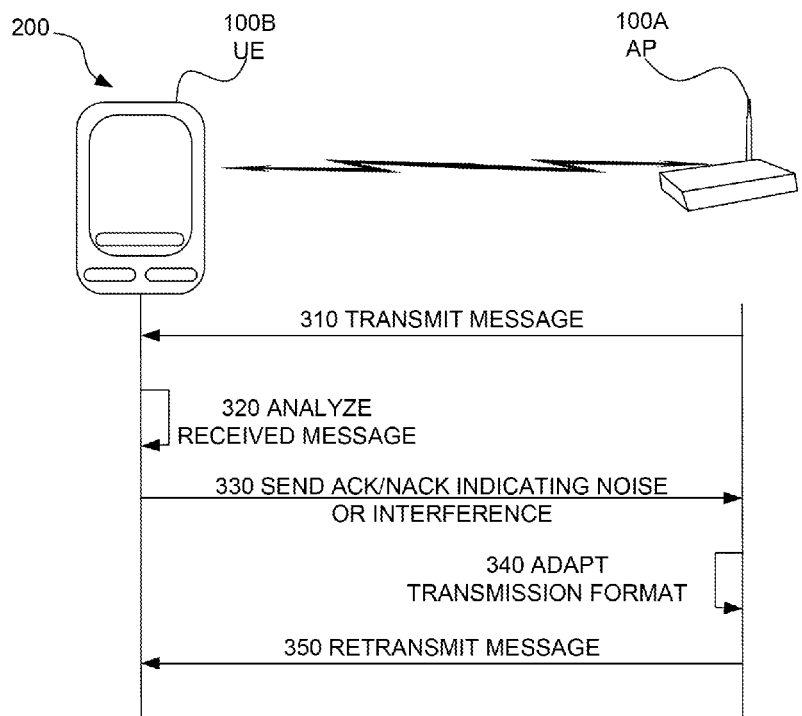
FIG. 3 shows a schematic view of a communication system in combination with a time graph of the functions of the radio frequency communication devices of the communication system according to one embodiment of the teachings of this application.

FIG. 3 shows a schematic view of a communication system 200 as the communication system of FIG. 2 in combination with a time graph of the functions of the RF communication devices 100A and 100B of the communication system 200.

A transmitting RF communication device 100A, in this example an access point (AP), transmits a signal (or message encoded as a digital signal) 310 to a receiving RF communication device 100B, in this example a user equipment (UE). The receiving RF communication device 100B tries to decode the message. The receiving RF communication device 100B analyzes the received message 320 and determines if the transmission was corrupted due to noise or due to interference.

This determination of whether the primary source of degradation is due to noise or interference can be done in a variety of manners and the disclosure of this application should not be construed as to be limiting to the details of how such a determination is made.

In one embodiment, the controller is configured to look at the received signal strength, for example the RSSI (Received Signal Strength Indicator). If the received signal strength is good and there are still decoding errors, the controller concludes that interference is the problem. The received signal strength can (for instance) be determined by the setting of the AGC (Automatic Gain control) in the receiver.

On the other hand, if the received signal strength is small and there are errors it is likely that the weak signal strength is the problem and thus the link is mainly noise limited.

In an alternative (and/or additional) embodiment, the controller is configured to determine that interference rather than noise is the dominant source of degradation by monitoring the quality throughout the received packet. In case the quality changes abruptly, the controller determines that an interferer suddenly became present, whereas if the quality of the received signal remains essentially the same throughout the packet, the controller determines that noise is the primary source of degradation.

This determination whether noise or interference is the primary source of degradation may be done irrespective of whether it is possible to decode the packet correctly or the decoding is erroneous, although it may be easier to determine in case of decoding error.

In an alternative embodiment, the determination is done based on whether there is interference present, without analyzing the received packet. One example of this embodiment is when the receiver is collocated with a potential interferer and knowledge of the activity of the collocated interferer is signaled via some interface.

In alternative embodiments, the receiver can try to determine how far it was from successful reception. One approach for doing this is to make an estimate of the effective SNR (Signal-to-Noise Ratio) during the reception of the packet and compare this to what effective SNR is typically needed for successful decoding. If these two SNR values are close, the receiver may indicate that the reception was close to being successful, whereas if the estimated SNR value is much smaller than what is needed, the receiver can indicate that it was far from being successful. In case interference is determined to be the main problem, it is quite likely that interference will not be present throughout the entire packet, but will only corrupt a part of it. In this situation, the fraction of the packet that is corrupted is a relevant measure for how close the receiver is to successful decoding. If it, for instance, is known that successful decoding is possible if not more than 25% percent to the packet is interfered, the decoding can be declared as being close to successful if 25%-50% of the packet is interfered, but declared as being far from successful if more than 50% of the packet is interfered. Other partitions are of course possible.

In another embodiment, the receiver can, based on the properties of the experienced interference, make an assessment of what wireless standard causes the interference. As an example, suppose the interfered standard (the victim) identifies that the interference always has a certain duration, say corresponding to a maximum length packet in the IEEE 802.11g standard. The interfered device may then assume the interference is in fact a device using IEEE 802.11g and then indicate this to the other end.

The receiving RF communication device 100B sends an acknowledgement message to the transmitting RF communication device 100A indicating whether the message was properly received or not. Examples of such a message are well-known in the prior art as acknowledgment message or ACK/NACK (Not ACKnowledged) messages.

In general, an acknowledgment message comprises control data and information on whether a corresponding message was received correctly or not and is being sent by the receiving RF communication device in response to receiving the corresponding message to the transmitting RF communication device.

In one embodiment a bit part indicating whether the corruption was caused by noise (N) or interference (I) is appended to the acknowledgment message. It should be noted that it is also possible to send the bit part indicating whether the corruption was caused by noise (N) or interference (I) as a stand alone message or appended to other feedback messages.

Figure 4:
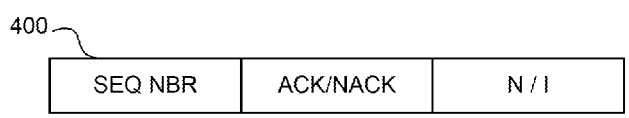
FIG. 4 shows a schematic view of an ACK/NACK portion of a general acknowledgment message according to one embodiment of the teachings of this application.

FIG. 4 shows a schematic view of an ACK/NACK portion 400 of a general acknowledgment message. The ACK/NACK portion 400 has a first portion (SEQ NBR) indicating the sequence number of the transmitted message so that the transmitting RF communication device 100A can identify which message the ACK/NACK is for. The ACK/NACK portion 400 also has a second portion (ACK/NACK) indicating whether the receipt of the corresponding transmitted message is acknowledged (ACK) or not (NACK). The second portion (ACK/NACK) may be implemented as one bit (for example 0: ACK, 1: NACK).

The ACK/NACK portion 400 also has a third portion (N/I) indicating whether the reception is influenced or corrupted by mainly noise (N) or interference (I).

The N/I portion may be implemented as one bit (for example 0: Noise, 1: Interference) that is appended to the second portion (ACK/NACK).

The conditions for the reception can thus be reported back to the transmitting RF communication device 100A using only two bits according to below.

"00": Packet not correctly received, main error cause: Noise.

"01": Packet not correctly received, main error cause: Interference.

"10": Packet correctly received, main limiting factor: Noise.

"11": Packet correctly received, main limiting factor: Interference.

Using this simple coding, the transmitting RF communication device 100A is able to determine what limits the quality of the reception of the transmitted message. This enables the transmitting RF communication device 100A to adapt 340 its coding scheme accordingly and retransmit the message 350.

It should be noted that the message that is to be retransmitted, need not be exactly the same message as was originally sent, but may be a message combined with the original message, such as for example using incremental redundancy.

To best improve the chances of a successful transmission of a signal/message when the channel is mostly or primarily influenced or disturbed by noise (such as when the signal strength is too weak), a coding scheme such as forwarding error correcting code (FEC) may beneficially be used.

To best improve the chances of a successful transmission of a signal/message when the channel is mostly or primarily influenced or disturbed by interference, a coding scheme such as automatic retransmission request (ARQ) may beneficially be used.

Using FEC when the channel is mainly influenced by interference can cause an added error bit rate in that the FEC extends the packet length, thereby increasing the chances of interference corrupting the signal.

Using ARQ when the channel is mainly influenced by noise may not be successful in that the signal may still be too weak to be successfully transmitted. As ARQ works by resending the same message under the same circumstances there is little chance of successful transmission if the conditions for successful transmission are not met (i.e. if the signal strength is still too low).

Thus, by being informed by the receiving RF communication device 100B of the main cause of corruptingly influencing the signal, the transmitting RF communication device 100A is able to select an appropriate coding scheme. If the main cause is noise, the controller of the transmitting RF communication device 100A adapts the coding scheme to an FEC coding scheme.

If the main cause is interference, the controller of the transmitting RF communication device 100A adapts the coding scheme to an ARQ coding scheme.

The retransmission 350 of the message will therefore stand a higher chance of being successfully received by the receiving RF communication device 100B.

By enabling the receiving RF communication device 100B to indicate to the transmitting RF communication device 100A what the conditions are, the transmitting RF communication device 100A is able to adapt its coding scheme accordingly and does not need to make estimations or costly retransmissions trying to find a coding scheme that is properly adapted to the conditions. It is also much easier for a receiving RF communication device 100B to determine what the conditions are as it can analyze the received message in details. This is especially helpful as the signal environment close to the receiving RF communication device 100B may be significantly different to the signal environment close to the transmitting RF communication device 100A (and also between the transmitting RF communication device 100A and the receiving RF communication device 100B) making it nearly impossible for the transmitting RF communication device 100A to determine which coding scheme (including possibly the signal strength) could be used most effectively.

In one embodiment the receiving RF communication device 100B is further configured to determine the type of the interference. Such interference types may be interference caused by any of the radio frequency standards discussed in relation to the radio frequency communication interface 130 in the above.

Figure 5:
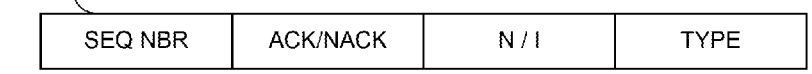
FIG. 5 shows a schematic view of an alternative ACK/NACK portion of a general acknowledgment message according to one embodiment of the teachings of this application.

FIG. 5 shows a schematic view of an ACK/NACK portion 400 of a general acknowledgment message as in FIG. 4. In one embodiment the ACK/NACK portion 400 also has a fourth portion (TYPE) indicating the type of the interference. The TYPE portion may be one or more bits and coded to identify the RAT causing the interference.

In one embodiment the TYPE portion may only be one bit indicating whether the interference is caused by the same RAT as is used by the transmitting RF communication device 100A. For example, if the transmitting RF communication device 100A is operating according to the WiFi standard (IEEE 802.11) and the interference is caused by a Bluetooth® device, the bit could be set to indicate that the interference is caused by another RAT. In other words, the coding would be 0: same RAT; 1: different RAT.

This enables the transmitting RF communication device 100A to adapt the coding scheme more precisely by knowing what kind of RAT is causing the interference. For example, knowing the transmission times of an interfering RAT will help set a time for a retransmission using the ARQ scheme.

In one embodiment the receiving RF communication device 100B is further configured to determine the severity of the interference (or noise) and to append information indicating the severity to the acknowledgment message.

Figure 6:
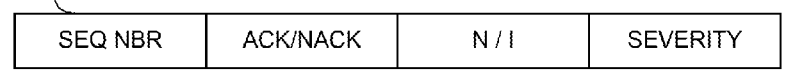
FIG. 6 shows a schematic view of an alternative ACK/NACK portion of a general acknowledgment message according to one embodiment of the teachings of this application.

FIG. 6 shows a schematic view of an ACK/NACK portion 400 of a general acknowledgment message as in FIG. 4. In one embodiment the ACK/NACK portion 400 also has a fifth portion (SEVERITY) indicating the severity of the interference. The SEVERITY portion may be one or more bits and coded to indicate the severity of the interference, each level of severity corresponding to a bit pattern.

In one embodiment the SEVERITY portion may only be one bit indicating whether the interference is sever or not sever. For example 0: not sever; 1: sever.

In one embodiment the receiving RF communication device 100B is configured to determine the amount of increase in transmitting power for a message to be correctly received. The increase in power may be determined based on a current signal strength compared with the strength of the surrounding noise or the interference. The increase in transmitting power can be determined by deducing how much stronger the received signal needs to be to properly differentiate from the noise and/or interference.

Figure 7:
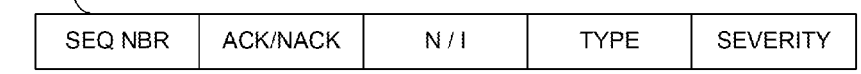
FIG. 7 shows a schematic view of an alternative ACK/NACK portion of a general acknowledgment message according to one embodiment of the teachings of this application.

FIG. 7 shows a schematic view of an ACK/NACK portion 400 of a general acknowledgment message as in FIG. 4, where both the type of interference and the severity of the interference is appended to the ACK/NACK portion.

In one embodiment the receiving RF communication device 100B may be further configured to determine other parameters of the interference and to indicate these to the transmitting RF communication device 100A by using a bit pattern of one or more bits corresponding to the parameters. In one example, the expected duration or length of an interference may be determined and indicated to the transmitting RF communication device 100A using 1 or more bits. Each level in the bit pattern, for example, corresponding to 100 us (micro seconds).

In one embodiment the receiving RF communication device 100B may be configured to determine a time when a retransmission would be most favorable. This can be determined by analyzing the interference and deducing RAT used, packet length and possibly which interleaving scheme is sued. Knowing this the receiving RF communication device 100B (and/or the transmitting RF communication device 100A) may determine when a retransmission of the message would be most likely to successfully being transmitted.

It should be noted that the communication between the RF communication devices 100 relating to the acknowledgment is handled in a physical layer of a communication protocol used and as such the teachings herein are applicable to any RF communication device communicating with another RF communication device, and should not be construed as being limited to communication networks such as defined by the above-mentioned standards.

Figure 8:
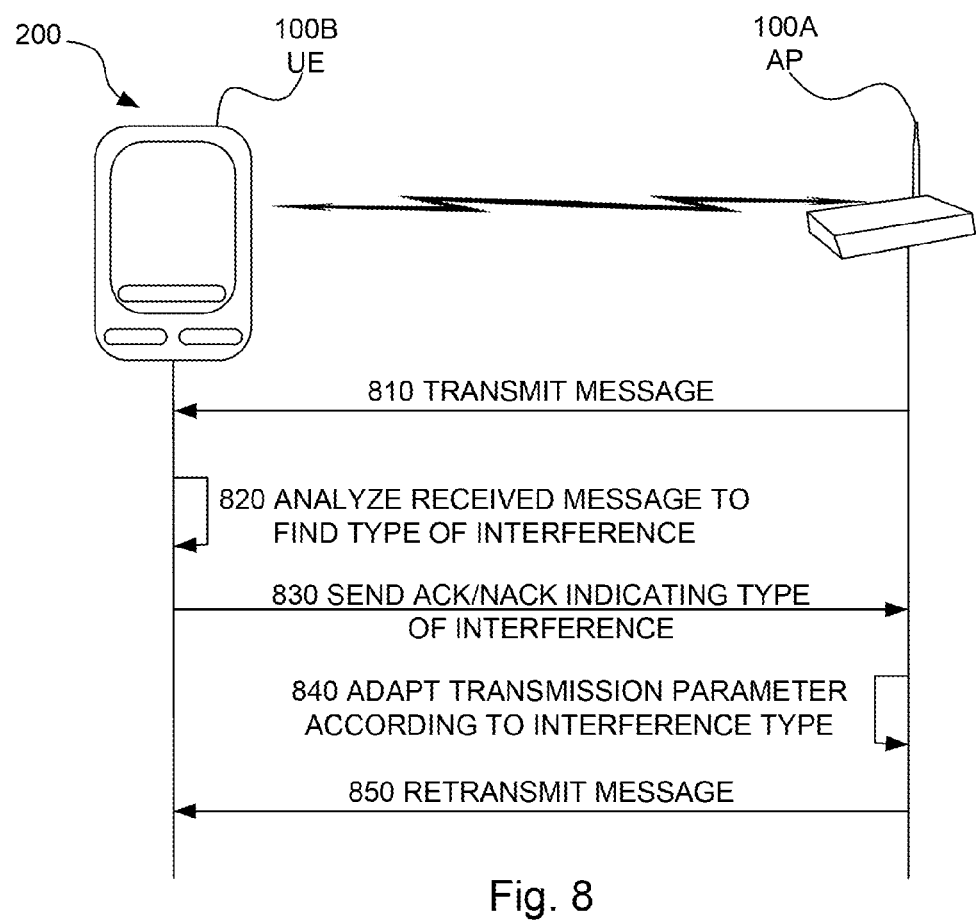
FIG. 8 shows a schematic view of a communication system in combination with a time graph of the functions of the radio frequency communication devices of the communication system according to one embodiment of the teachings of this application.

FIG. 8 shows a schematic view of a communication system 200 such as the communication system of FIG. 2 in combination with a time graph of the functions of the RF communication devices 100A and 100B of the communication system 200.

It should be noted that FIG. 8 shows an example of adapting a transmission parameter and that in the example of FIG. 8 it is the transmission time that is changed.

Other transmission parameters that may be changed are message length. Coding scheme and transmission power. The teachings disclosed in relation to adapting the transmission time are also applicable to adapting the other transmission parameters.

A transmitting RF communication device 100A, in this example an access point (AP), transmits 810 a signal (or message encoded as a digital signal) to a receiving RF communication device 100B, in this example a user equipment (UE). The receiving RF communication device 100B tries to decode the message. The receiving RF communication device 100B analyzes the received message 820 and determines that the transmission was corrupted due to interference and determines the type of interference.

The controller may be configured to determine the type of interference by observing characteristics of the radio channel over time. The controller may be alternatively or additionally configured to determine the type of interference based on knowledge about the environment in which the RF communicating devices 100A and 100B are deployed. The type of interference may also be provided to either the receiving Radio frequency communication device 100B or the transmitting radio frequency communication device 100A by another RF communication device 100, such as another access point 100 or base station 100. This also applies to finding the type of interference as disclosed above with regards to FIGS. 4 to 7.

The interference type may be another RAT such as WiFi, Bluetooth, ZigBee or other alternatives as given herein, especially with regards to the radio communication interface 130.

In one embodiment the controller 110 is configured to determine that the interference is of a synchronous type and to determine the communication cycle for the synchronous interference type. One example of a synchronous RAT is the Bluetooth Synchronous Connection Oriented (SCO) link. The SCO link repeatedly transmits for up to 625 micro seconds every T seconds, T being negotiated and usually of 1.25 ms to 3.75 ms. A synchronous interfering type thus have an active time period and a silent time period between the active periods. ZigBee and IEEE 802.11 may also exhibit a cyclostationary interference pattern.

For some RATs, the controller is able to determine how much longer the current transmission will go on, especially if monitoring the data communication. The controller 110 is thus configured to determine an estimated silent time, that is, a time point when the active time period ends.

The receiving radio frequency communication device 100B then sends an acknowledgement message 830 (as has been disclosed above with reference to FIGS. 3 to 7) comprising information indicating the type of interference.

Possibly the acknowledgement message comprises a time indicator, indicating when retransmission is to be made. The time indicator may be transmitted along with the interference type, or the time indicator is the sole information on the interference type. The time indicator may be a simple time indicating a time point when the next transmission may be done (or a time period that the transmitter should wait before making another transmission). The time indicator may also be an indicator of a synchronous behavior, that is, the length of an active period, the length of a silent period and a reference point for when a new active time period starts. The length of the silent period may also be derived from the period of the synchronous communication and the length of the active time period.

The transmitting radio frequency communication device 100A receives the acknowledgement indicating the type of interference.

In one embodiment the transmitting radio frequency communication device 100B is configured to determine the time indicator based on the interference type.

The controller 110 of the transmitting radio frequency communication device 100A is further configured to adapt 840 a transmission parameter, such as a time for a transmission based on the type of interference and/or the time indicator. The transmitting radio frequency communication device 100A thereafter retransmits the message at the adapted time. In one embodiment the adapted time is a time falling within the silent time of the interferer or a time falling outside the active time period of the interferer. As has been discussed above the retransmitted message may not need to be the exact same message as the previously transmitted message.

In one embodiment the controller 110 of the transmitting radio frequency communication device 100A is configured to adapt the transmission time for future transmissions according to the indicated interference type, not just for the retransmission. Alternatively, the transmitting radio frequency communication device 100A only adapts the transmission time for future transmissions ensuring that at least future transmissions will be received without suffering from interference.

By adapting the transmission time according to any interferer and transmit messages outside an active period of an interferer, the transmitting radio frequency communication device 100A can greatly reduce the risk of a message being corrupted by an interferer which will lead to a reduced need for retransmitting messages, which, in turn, leads to a more conservative use of the available bandwidth.

In one embodiment the controller 110 of the transmitting radio frequency communication device 100A is further configured to adapt the length of the message to be retransmitted or transmitted based on the interference type, or the silent time period for the interference type.

If the silent time for an interferer or interference type is shorter than the message length, the message to be (re-)transmitted may be split up by the controller and sent as two or more messages. This ensures that the message is transmitted without being corrupted by the specific interferer.

If the silent time for an interferer or interference type is longer than the message length, the message to be (re-)transmitted may be combined with other messages or data by the controller and the combined message is sent as one message. This increases the bandwidth of the communication system 200 and enables for a higher data throughput. The controller 110 may also be configured to adapt the coding to be more powerful and/or increase the interleaving time if the silent time allows for the increased length of the message. This increases the chances of the receiving radio frequency communication device 100B being able to correctly decode the message even if the message is subjected to a (relatively) short interference burst or noise.

In one embodiment the controller 110 of the transmitting device is configured to adapt the transmission parameter being the message length so that the message may be resent having a message length more suited to the transmission environment as has also been disclosed above.

In one embodiment the controller 110 of the transmitting device is configured to adapt the transmission parameter being the transmission power so that the message may be transmitted at a power level more suited to the current transmission environment. If there is no interference, the transmission power may be lowered so that the power consumption is reduced.

As an example, a message which was very close to being correctly received, the message sent in the retransmission might be considerably shorter than the original packet, say only 25% in length, thus using less transmission energy and in addition causing less interference to other devices in the vicinity. Alternatively, the retransmission could have been of the same length, but transmitted at a reduced power compared to the first transmission.

Accordingly, the parameters for the retransmission message and future messages may be chosen based on the root cause of problem (interference type) and how far from successful reception the first attempt was. The retransmission message and future messages might effectively contain more or less bits than the original message. In order to accomplish the higher signaling energy required, the message and future messages may be (re-)transmitted using more bits than in the original transmission. Alternatively, the retransmitted message may be sent using the same number of bits but at a lower bit rate thus increasing the duration of the retransmitted packet and thereby also increasing the signaling energy for it. Finally, the same number of bits can be used for the retransmission while simply increasing signaling power.

In one embodiment, the coding scheme may be adapted. The coding scheme may be adopted as has been disclosed in the above with reference to FIGS. 3 to 7.

Figure 9:
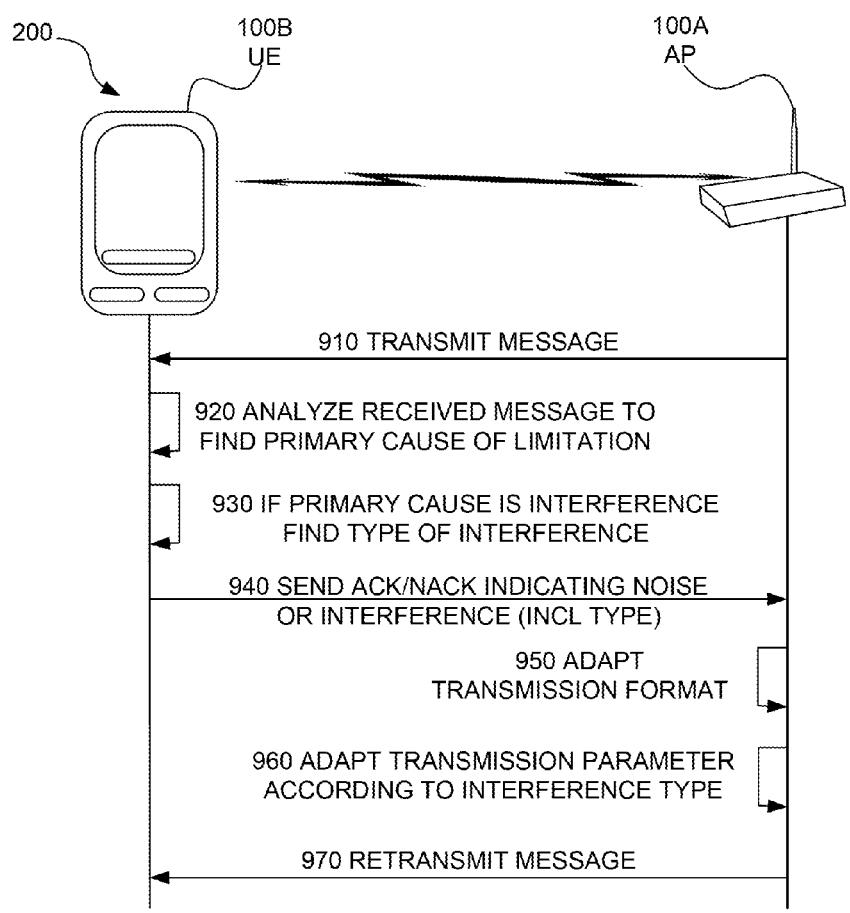
FIG. 9 shows a schematic view of a communication system in combination with a time graph of the functions of the radio frequency communication devices of the communication system according to one embodiment of the teachings of this application.

FIG. 9 shows a schematic view of a communication system 200 such as the communication system of FIG. 2 in combination with a time graph of the functions of the RF communication devices 100A and 100B of the communication system 200. The functions of the communication system 200 being represented in FIG. 9 is a combination of the functions being represented in FIG. 3 (and disclosed with reference to FIGS. 4 to 7) and the functions being represented in FIG. 8.

As for FIG. 8, it should be noted that FIG. 9 shows an example of adapting a transmission parameter and that in the example of FIG. 9 it is the transmission time that is changed.

Other transmission parameters that may be changed are message length, coding scheme and transmission power. The teachings disclosed in relation to adapting the transmission time are also applicable to adapting the other transmission parameters.

A transmitting RF communication device 100A, in this example an access point (AP), transmits 910 a signal (or message encoded as a digital signal) to a receiving RF communication device 100B, in this example a user equipment (UE). The receiving RF communication device 100B tries to decode the message. The receiving RF communication device 100B analyzes the received message 820 and determines if the transmission was corrupted due to noise or due to interference to find the primary cause of limitation.

If the primary cause is interference, the controller 110 determines 930 the type of interference.

The receiving radio frequency communication device 100B transmits 940 an acknowledgment message to the transmitting radio frequency communication device 100A indicating the primary cause, and if the primary cause is interference, the type of interference is also communicated.

The transmitting radio frequency communication device 100A receives the acknowledgement message indicating the type of interference and adapts 950 a transmission format according to the primary cause. If the primary cause is interference, the transmission time is also adapted 960 according to the interference type.

It should be noted that the receiving radio frequency communication device 100B may also indicate an interference type to the transmitting radio frequency communication device 100A even if interference is not the primary cause and the transmitting radio frequency communication device 100A may then adapt 960 the time for transmission based on the interference type.

As the time for transmission will not affect the coding scheme or other transmission format, the trade-off between suitable technologies for dealing with noise or interference is not affected. By adapting to a suitable technology or format for overcoming noise problems and adapting the transmission time according to interference type, the chances of a successful transmission of a message is greatly increased even under severe transmission conditions.

The transmitting radio frequency communication device 100A thereafter retransmits 970 the message at the adapted time.

Various variations and alternatives as discussed in relation to the embodiments of FIGS. 3 to 7 and FIG. 8 also apply to the embodiments of FIG. 9.

In another embodiment that is useful when the interference signal is relatively short, a special coding scheme is used in combination with a soft decoder such that the receiver is capable of determining how the quality of the decoded data varies over the entire packet duration. The information data that is encoded on the transmitter side is divided into two or more segments. In case the estimated quality of the decoded data falls below a certain threshold, the receiving end asks for a retransmission of the segment(s) that contain said low quality decoded data. Then, the transmitter needs only to retransmit the failing segment(s) which leads to shorter retransmission packets. Shorter packets are good for the receiver as they are less likely to be hit by interfering signals, and they are also good for all other radio communication devices as it keeps the overall interference at a lower level. Clearly, the timing of the retransmission can (and should) be scheduled to avoid known cyclostationary interferers.

One advantage of the manner taught herein is that it provides a means to quickly find the most suitable coding scheme to be used for communicating between two devices (or RF communication devices). This is especially useful in case of relatively short connections and when the channel conditions changes rapidly.

Another advantage is provided in that a use of the most suitable packet format (coding scheme) increases spectrum efficiency for the communication system, reduces interference to other users as well as saves power by reducing the number of retransmissions necessary and by keeping the transmission power levels at a low level, but still sufficient enough to provide successful transmissions.

Another advantage is that by adapting the transmission time, a higher throughput is achieved as unnecessary resends are greatly decreased.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A radio frequency communication device comprising:
a radio frequency communication interface; and
a controller, wherein said controller is configured to:
transmit a message through said radio frequency communication interface to a receiving radio frequency communication device using a transmission format;
receive an indication that indicates one of two possible types of primary limitation to the reception of the message, the two possible types of primary limitation to the reception of the message being noise-limited and interference-limited, from said receiving radio frequency communication device;
adapt said transmission format based upon the received indication; and
retransmit said message using said adapted transmission format.

2. The radio frequency communication device of claim 1, wherein said controller is further configured to:
receive an indication of a type of interference limiting the reception of the message;
adapt a time for transmission based on said type of interference; and
retransmit said message at said adapted transmission time.

3. The radio frequency communication device of claim 1, wherein said indication is part of an acknowledgment message being sent by the receiving radio frequency communication device in response to receiving the corresponding message to the transmitting radio frequency communication device.

4. The radio frequency communication device of claim 1, wherein said indication is part of a message comprising ACK/NACK bits.

5. The radio frequency communication device of claim 1, wherein said indication further includes an indication on the severity of the interference.

6. The radio frequency communication device of claim 5, wherein said indication on the severity of the interference includes an indication on an increase in transmitting power for a reception to be successful.

7. The radio frequency communication device of claim 1, wherein said indication further includes an indication on the type of the interference.

8. The radio frequency communication device of claim 7, wherein said indication on the type of the interference is binary coded to indicate if the interference is of a same radio access technology used by the radio frequency communication device or of another radio access technology.

9. The radio frequency communication device of claim 7, wherein the indication on the type of the interference indicates a standard, wherein the transmission causing the interference is being transmitted according to said standard, and wherein the standard is taken from a group of standards comprising: IEEE 802.11 (WiFi), IEEE 802.15.4 (ZigBee), Bluetooth®, NFC (Near Field Communication) or other short range (radio frequency) communication interface, RFID (Radio Frequency Identification), Sigfox, Universal Mobile Telecommunications System (UMTS), 3GPP Long Term Evolution (LTE), High Speed Packet Access (HSPA), or Global System for Mobile communication (GSM).

10. The radio frequency communication device of claim 7, wherein the indication on the type of the interference indicates a type operating in an unlicensed band.

11. The radio frequency communication device of claim 10, wherein said type operating in an unlicensed band is a type operating in an industrial, scientific and medical (ISM) band.

12. A radio frequency communication device comprising:
a radio frequency communication interface; and
a controller, wherein said controller is configured to:
receive a message through said radio frequency communication interface from a transmitting radio frequency communication device;
determine a primary cause of limitation to reception of the received message, wherein the primary cause of limitation is exactly one of either noise or interference;
transmit an indication of the primary cause of limitation to said transmitting radio frequency communication device; and
receive a retransmitted version of said message having been transmitted from said transmitting radio frequency device using an adapted transmission format.

13. The radio frequency communication device of claim 12, wherein said controller is further configured to analyze said received message to determine the primary cause of limitation.

14. The radio frequency communication device of claim 12, wherein said controller is further configured to determine a time indicator based on a type of interference and transmit said time indicator to said transmitting radio frequency communication device.

15. The radio frequency communication device of claim 12, wherein said indication is part of an acknowledgment message being sent by the receiving radio frequency communication device in response to receiving the corresponding message to the transmitting radio frequency communication device.

16. The radio frequency communication device of claim 12, wherein said indication is part of a message comprising ACK/NACK bits.

17. The radio frequency communication device of claim 12, wherein said indication further includes an indication on the severity of the interference.

18. The radio frequency communication device of claim 17, wherein said indication on the severity of the interference includes an indication on an increase in transmitting power for a reception to be successful.

19. The radio frequency communication device of claim 12, wherein said indication further includes an indication on the type of the interference.

20. The radio frequency communication device of claim 19, wherein said indication on the type of the interference is binary coded to indicate if the interference is of a same radio access technology used by the radio frequency communication device or of another radio access technology.

21. The radio frequency communication device of claim 19, wherein the indication on the type of the interference indicates a standard, wherein the transmission causing the interference is being transmitted according to said standard, and wherein the standard is taken from a group of standards comprising: IEEE 802.11 (WiFi), IEEE 802.15.4 (ZigBee), Bluetooth®, NFC (Near Field Communication) or other short range (radio frequency) communication interface, RFID (Radio Frequency Identification), Sigfox, Universal Mobile Telecommunications System (UMTS), 3GPP Long Term Evolution (LTE), High Speed Packet Access (HSPA), or Global System for Mobile communication (GSM).

22. The radio frequency communication device of claim 19, wherein the indication on the type of the interference indicates a type operating in an unlicensed band.

23. The radio frequency communication device of claim 22, wherein said type operating in an unlicensed band is a type operating in an industrial, scientific and medical (ISM) band.

24. A method for use in a radio frequency communication device comprising a radio frequency communication interface, wherein said method comprises:
transmitting a message through said radio frequency communication interface to a receiving radio frequency communication device using a transmission format;
receiving an indication that indicates one of two possible types of primary limitation to the reception of the message, the two possible types of primary limitation to the reception of the message being noise-limited and interference-limited, from said receiving radio frequency communication device;
adapting said transmission format based upon the received indication; and
retransmitting said message using said adapted transmission format.

25. A method for use in a radio frequency communication device comprising a radio frequency communication interface, wherein said method comprises:
receiving a message through said radio frequency communication interface from a transmitting radio frequency communication device;
determining a primary cause of limitation to reception of the received message, wherein the primary cause of limitation is exactly one of either noise or interference;
transmitting an indication of the primary cause of limitation to said transmitting radio frequency communication device; and
receiving a retransmitted version of said message having been transmitted from said transmitting radio frequency device using an adapted transmission format.

* * * * *